United States Patent [19]
Wesley

[11] Patent Number: 5,165,318
[45] Date of Patent: Nov. 24, 1992

[54] CUTTING LINK FOR SAW CHAIN AND METHOD OF RESHARPENING SAME

[75] Inventor: William W. Wesley, Dyer, Tenn.

[73] Assignee: Sandvik AB, Sandviken, Sweden

[21] Appl. No.: 587,856

[22] Filed: Sep. 25, 1990

[51] Int. Cl.⁵ ............................................. B27B 33/14
[52] U.S. Cl. ..................................................... 83/834
[58] Field of Search .................. 83/830, 832, 833, 834

[56] References Cited

U.S. PATENT DOCUMENTS

| | | | |
|---|---|---|---|
| 2,508,784 | 5/1950 | Cox | 83/834 |
| 2,515,550 | 7/1950 | Ciba | 83/834 |
| 3,338,116 | 8/1967 | McLean | 76/36 |
| 3,469,610 | 9/1969 | Silvon | 83/831 |
| 4,348,926 | 9/1982 | Dolata et al. | 83/833 |
| 4,412,463 | 11/1983 | Beerens | 76/36 |
| 4,581,968 | 4/1986 | Gibson et al. | 83/834 |
| 4,911,050 | 3/1990 | Nitschmann | 83/834 |

Primary Examiner—Frank T. Yost
Assistant Examiner—Allan M. Schrock
Attorney, Agent, or Firm—Burns, Doane, Swecker & Mathis

[57] ABSTRACT

A saw chain is composed of a plurality of cutter links, each link comprising a cutter part and a depth gauge located ahead of the cutter part. The links are designed to enable a cutting edge of the cutter part to be resharpened without having to remove the entire top surface of the depth gauge, and without changing the geometry of the link to such an extent as would result in significantly different cutting characteristics.

6 Claims, 2 Drawing Sheets

CUTTING LINK FOR SAW CHAIN AND METHOD OF RESHARPENING SAME

BACKGROUND OF THE INVENTION

The invention relates to a saw chain for power saws with improved handling and safety properties.

The most common types of saw chains for wood cutting have, as depicted in FIG. 4, sidelinks 1 with chisel-type cutters 2 preceded by depth gauges 3 as described for example in U.S. Pat. Nos. 2,508,784 and 2,515,550. The depth gauge serves to determine the normal depth of cut (corresponding to the chip thickness) and to interrupt or limit cutting if the cutting edge strikes such a hard portion of the wood that the cutting link tends to tilt backwards. The cutting links are of alternating right hand and left hand configurations, and are mirror images of each other. To limit or eliminate the dangerous kick-back phenomenon which can occur when the links are cutting while moving within the curved path around the nose of the guide bar from the upper side to the lower side, it is customary to arrange the depth gauge in such a way that the depth of cut determined thereby is decreased when the links move in a curved path. This is achieved by locating the depth gauge at a greater distance D from the center line 4 of the link than the distance D' from the cutting edge to the center line.

Furthermore, it has been disclosed in the afore-mentioned U.S. Pat. No. 2,508,784 that by laterally bending the depth guide, the maximum possible lateral depth of cut can be limited, which will help the chain to run straight and stable even on a worn guidebar.

The cutting link is resharpened (see the broken line 5 in FIG. 4) by filing with a round file as described in the afore-menioned U.S. Pat. No. 2,508,784, in a manner displacing the cutting edge 6 towards the rear. Since the top of the cutter must be provided with a slight relief angle A, the cutting edge is, in effect, slightly lowered, which would decrease the depth of cut. This is prevented by lowering also the depth gauge, usually by filing the top of the depth gauge with a flat file (see the broken line 7). To adjust the height of the depth gauge with the required precision, numerous guides have been proposed, such as those disclosed in U.S. Pat. No. 3,338,116 and U.S. Pat. No. 4,412,463 where the depth gauge is filed until its top is level with the filing guide. However, considerable skill is required in order to determine exactly when to stop filing. Also, the filing will remove from the depth gauge any smooth anti-friction coating such as chrome plating, leaving instead crosswise scratches, which will impair the safety against kick-back.

Another problem is that upon adjusting the depth gauge by lowering the top leaves the peak 8 of the depth gauge at substantially the same distance D to the center line of the link, whereas the distance D" between the resharpened cutting edge 6 and the center line 14 is longer than the previous distance D'. This causes the curve depth of cut to increase, also impairing the kick-back safety.

SUMMARY OF THE INVENTION

The present invention defines a saw chain with a new type of cutting link designed to allow the normal depth of cut, the lateral depth of cut and the curve depth of cut to be maintained better than in previous saw chains, and to allow the depth gauge to be adjusted without destroying the anti-friction coating. A saw chain according to the invention will feel the same to the user and be as safe even after considerable wear.

BRIEF DESCRIPTION OF THE DRAWING

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

The cutting link of a saw chain according to the invention comprises a generally flat body part 10 having two rivet holes 11, 12. Projecting outwardly from the body at a location forwardly of a center line 13 (which preferably extends perpendicular to a front-to-rear longitudinal direction FR of the links and bisects the distance between the rivet holes) is a raised depth gauge 20, and projecting outwardly from the body at a location rearwards of the center line 13 is a cutter 30. The direction FR is parallel to the longitudinal direction of the guide bar.

Figure 1:
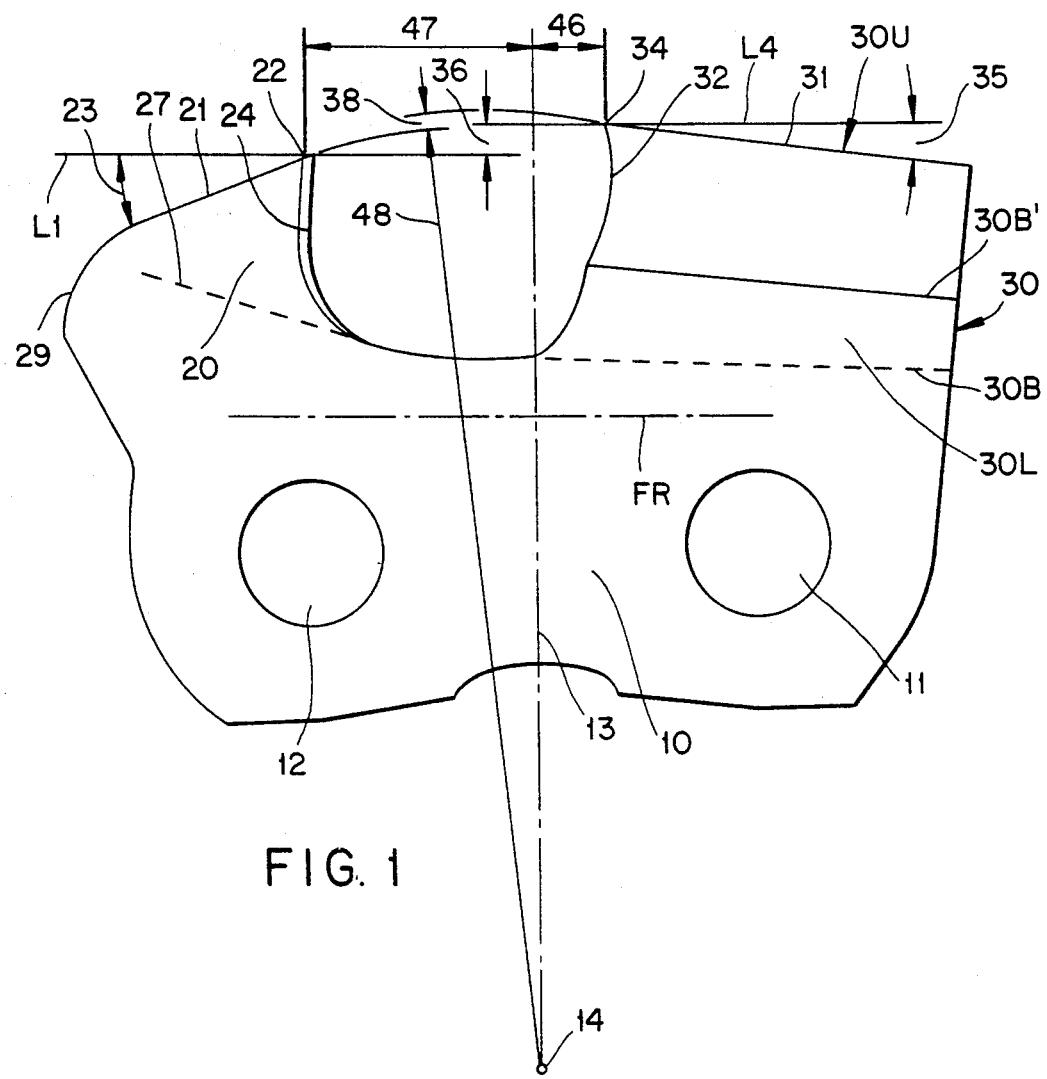
FIG. 1 is a side elevational view of a cutting link according to the present invention.
Figure 2:
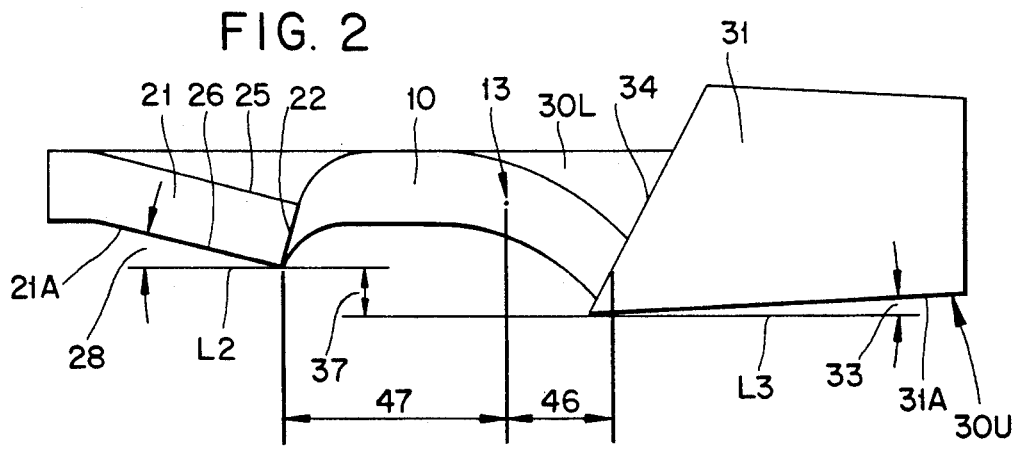
FIG. 2 is a plan view of the link depicted in FIG. 1.

The depth gauge 20 has a flat top face 21 rising from a front end of the link towards a peak 22 to form a top angle 23 with a line L1 extending parallel to the front-to-rear direction FR. The depth gauge 20 also includes a rear face 24 and two lateral faces 25, 26. The depth gauge 20 is bent slightly laterally along a rearwardly and inwardly sloping bend line 27. The bend line 27 terminates rearwardly of a front end 29 of the link (see FIG. 1), so that the edge 21A of the top face 21 which is disposed laterally beyond the plane of the body 10 forms a side angle 28 with a line L2 extending parallel to the front-to-rear direction as seen in plan (FIG. 2). That angle 28 opens toward the front.

The lower part 30L of the cutter 30 is bent laterally outwardly about a bend line 30B from the body part 10 in the same lateral direction as the depth gauge 20, and the upper part 30U of the cutter is bent sharply in the opposite lateral direction i.e., inwardly about a bend line 30B' to form a flat top 31 of the cutter. Each of the bend lines 30B, 30B' is oriented substantially parallel to the front-to-rear longitudinal direction FR. The lower part 30L has at its front end a lateral cutting edge 32, and behind this edge 32 an edge 31A of the flat top 31 forms a side relief angle 33 with a line L3 extending parallel to the front-to-rear direction which is parallel to the longitudinal axis of the guide bar. The upper part includes at its front end a transverse cutting edge 34, and behind this edge the top 31 forms a top relief angle 35 with a line L4 extending parallel to the front-to-rear direction FR. The lateral cutting edge 32 extends downwardly from an end of the transverse cutting edge, as shown in FIG. 1. The cutter 30 and the depth gauge 20 are preferably coated with a low friction layer such as chrome plating, at least on the top surfaces 31, 21 thereof.

The normal depth of cut 36 (FIG. 1) is defined as the difference in height between the transverse cutting edge 34 and the peak 22 of the depth gauge. The lateral cutting depth 37 (FIG. 2) is defined as the difference in lateral displacement between the lateral ends of the lateral cutting edge 32 and the peak 22 of the depth gauge. The curve depth of cut 38 (FIG. 1) is defined as the radial spacing between the curved travel paths of the peak 22 and the cutting edge 34 as the link traverses the nose of the chain saw. Those curved travel paths have a common center 14 which lies on the center line 13. FIG. 1 depicts the curve depth 38 with reference to a line 48 extending through the common center 14.

Figure 3:
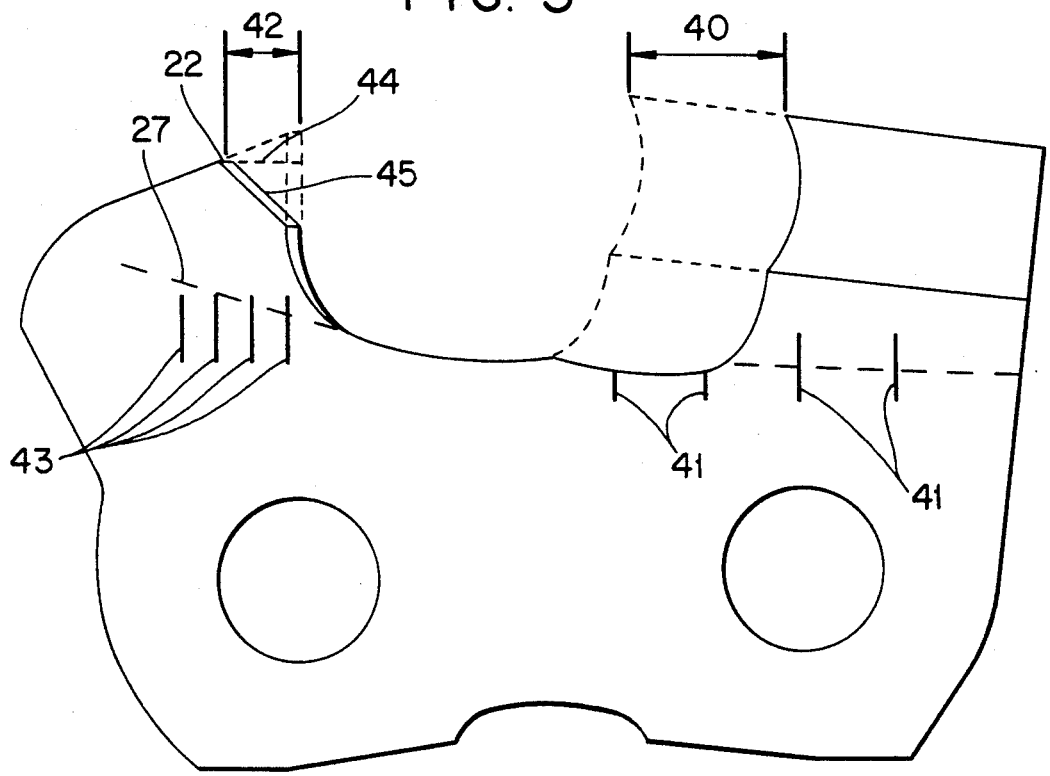
FIG. 3 is a side elevational view of the link of FIG. 1 after that link has been resharpened in accordance with the present invention.
Figure 4:
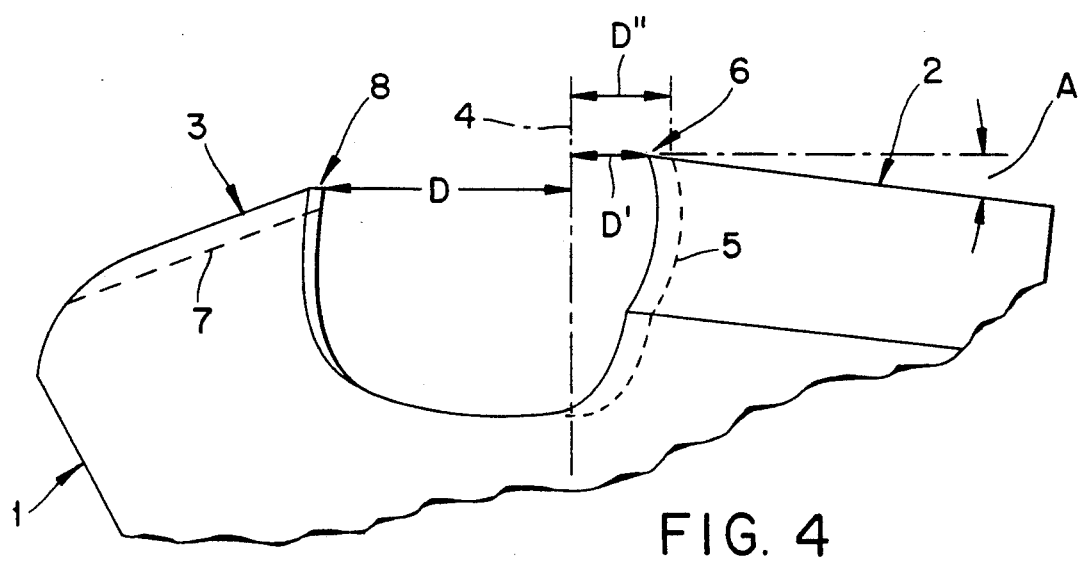
FIG. 4 is a side elevational view of an upper portion of a prior art cutting link showing a prior art manner of resharpening that link.

Resharpening of the cutter link occurs in two steps according to the invention. Firstly, the transverse and lateral cutting edges 34, 32 are simultaneously sharpened by filing with a round file. This causes a rearwards displacement 40 (FIG. 3) of those edges, which can be measured or estimated with reference to a set of reference marks 41 on the cutter 30. Thereafter, the rear part of the depth gauge is filed with a round or flat file to remove a small portion of the rearmost part of the top face 21 and all or part of the rear face 24, causing a forward displacement 42 of the peak 22 of the depth gauge which can be measured or estimated with reference to a set of reference marks 43 on the depth gauge 20. The displacement 42 should be a specified fraction of the rearward displacement 40 of the transverse edge. This will result in a filed surface 45 of the depth gauge having a steeper slope than the bend line 27 with respect to a line perpendicular to the center line 13.

The same final configuration could also be arrived at by first filing a horizontal flat 44 in the depth gauge with the aid of a simple filing guide such as described in U.S. Pat. No. 3,338,116, followed by filing the surface 45 having a steeper slope than the bend line 27 until the horizontal flat 44 is consumed.

Either of the above filing methods will leave intact the original low friction surface of the rising flat top face 21, while the filed surface 45, which contains crosswise scratches (and thus a higher friction), will not touch the wood being sawed. Since the friction force on the top face 21 is an important factor in causing kickback of the saw, a saw chain according to the invention will be less dangerous for the user.

Preferably, the change in normal depth of cut can be expressed as equal to [distance 42×angle 23]−[distance 40×angle 35], where the angles 23 and 35 are expressed in radians. The change in lateral depth of cut can be expressed as equal to [distance 42×angle 28]−[distance 40×angle 33], wherein the angles are expressed in radians. The change in curve depth of cut can be expressed as equal to [distance 42×angle 23]−[distance 40×angle 35]+[(distance 40)×(distance 40)×(distance 46/radius 48)]−[(distance 42×(distance 47/radius 48)], where the angles are expressed in radians.

In order to ensure that the normal depth of cut, the lateral depth of cut, and the curve depth of cut will not change when the link is resharpened, the ratio of the top angle 23 to the top relief angle 35 should be equal to the ratio of the side angle 28 to the side relief angle 33. For a chain with average wear, the ratio of the top angle 23 to the top relief angle 35 should also be equal to the ratio of the angle 28 to the angle 33. Those ratios should also be equal to the ratio of the distance 40 to the distance 42, as well as the ratio of the distance 47 separating the center line 13 and peak 22 to the distance 46 separating from the center line 13 and cutting edge 34. If the cutter and the depth gauge are provided with graduated markings 41, 43, then the ratio of the spacing between the cutter mark 41 to the spacing between the depth gauge marks 43 should also have this value.

In a practical case, the top angle can be 21°, the top relief angle 7°, the side angle 9°, and the side relief angle 3°, making the ratio of top angle to top relief angle equal to 3. A rearward displacement 40 of the cutting edge by 1.5 mm should then be accompanied by a forward displacement 42 of the peak by 0.5 mm.

Trying to establish the above relationship between the top angle 23 and the side angle 28 using a line of bending extending parallel to the front-to-rear direction would in general require severe local bending deformation through a large angle. However, by using a line of bending 27 which slopes rearwardly towards the rivets 12, 11 in accordance with the present invention, the bending deformation is much less severe, thereby minimizing tool wear and material defects.

Any of the earlier-described filing methods according to the present invention, will result in the ratio of top angle 23 to side angle 28 being equal to the ratio of the rearward displacement 40 to the forward displacement 42, leaving the normal depth of cut 36, the lateral depth of cut 37 and the curve depth of cut 38 all unchanged.

An important advantage of the present invention is that the cutting forces, the feed forces, the vibrations and the kick-back safety will be the same for resharpened chains as for fresh chains, allowing the user to work with optimal efficiency and safety throughout the life of the chain without changing the cutting technique.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A saw chain comprising a plurality of interconnected cutter links, each cutter link comprising:
   a substantially flat body part having rivet holes extending therethrough in a direction transversely of a front-to-rear direction of said body part, the front-to-rear direction extending parallel to a longitudinal axis of a guide bar,
   a cutter projecting from said body part and comprising a lower portion bent laterally outwardly from a plane of said body part about a first bend line, and an upper portion bent laterally inwardly toward said plane about a second bend line disposed between said first bend line and a top surface of said cutter, said first and second bend lines extending substantially parallel to the front-to-rear longitudinal direction, said top surface terminating forwardly in a transverse cutting edge, a lateral cutting edge extending from one end of said transverse cutting edge in a direction toward said body part, said top surface forming a top relief angle with the front-to-rear direction, a side edge of said top surface extending rearwardly from a point of intersection of said transverse and lateral cutting edges in a manner forming a side relief angle with the front-to-rear direction, and
   a depth gauge projecting from said body part in front of said cutter, said depth gauge including a top face extending rearwardly from adjacent a front end of said cutter and being simultaneously inclined in a direction away from said body part to form a top angle with the front-to-rear direction, said top face terminating rearwardly in a peak, said depth gauge being bent laterally outwardly about a third bend line such that a side edge of said top face, disposed on the same side of said cutting link as said side lateral cutting edge, extends forwardly from said peak and simultaneously toward a plane of said body part to form a side angle with the front-to-rear direction, a ratio of said to pangle to said top relief angle being equal to a ratio of said side angle to said side relief angle, said third bend line sloping with respect to the front-to-rear longitudinal direction.

2. A saw chain according to claim 1, wherein two of said rivet holes are spaced apart in the front-to-rear direction, an imaginary center line bisects the front-to-rear spacing between said two rivet holes, there being a first distance between said peak and said imaginary center line and a second distance between said transverse cutting edge and said imaginary center line, a ratio of said first distance to said second distance being equal to said ratio of said top angle to said top relief angle.

3. A saw chain according to claim 1 including a first set of graduated marks on said cutter, and a second set of graduated marks on said depth gauge, the marks of said first set being spaced apart by equal first increments in the front-to-rear direction, the marks of said second set being spaced apart by equal second increments in the front-to-rear direction, said first and second sets of marks defining measuring means for measuring the amounts of said cutter and depth gauge, respectively, which are removed during a filing operation.

4. Saw chain according to claim 3, wherein a ratio of said first increments to said second increments is equal to said ratio of said top angle to said top relief angle.

5. Saw chain according to claim 1, wherein said bend line extends rearwardly and is simultaneously inclined away from said peak.

6. A saw chain according to claim 1, wherein said top face of said depth gauge includes a rear section which terminates at said peak, said rear section being flat.

* * * * *